United States Patent
Klaerner (10) Patent No.: US 12,118,726 B2
(45) Date of Patent: Oct. 15, 2024

(54) INTELLIGENT PATTERN RECOGNITION SYSTEMS FOR WIRE BONDING AND OTHER ELECTRONIC COMPONENT PACKAGING EQUIPMENT, AND RELATED METHODS

(71) Applicant: Kulicke and Soffa Industries, Inc., Fort Washington, PA (US)

(72) Inventor: Peter Julius Klaerner, Corona, CA (US)

(73) Assignee: Kulicke and Soffa Industries, Inc., Fort Washington, PA (US)

(*) Notice: Subject to any disclaimer, the term of this patent is extended or adjusted under 35 U.S.C. 154(b) by 171 days.

(21) Appl. No.: 17/575,705

(22) Filed: Jan. 14, 2022

(65) Prior Publication Data
US 2022/0230314 A1    Jul. 21, 2022

Related U.S. Application Data (60) Provisional application No. 63/138,377, filed on Jan. 15, 2021.

(51) Int. Cl.
*G06T 7/00*      (2017.01)
*G06V 10/141*    (2022.01)
(Continued)

(52) U.S. Cl.
CPC .......... *G06T 7/0014* (2013.01); *G06V 10/141* (2022.01); *G06V 10/74* (2022.01);
(Continued)

(58) Field of Classification Search
CPC ......... G06T 7/0014; G06T 2207/10152; G06T 2207/30148; G06T 2207/30141;
(Continued)

(56) References Cited

U.S. PATENT DOCUMENTS

| 4,855,928 A | * | 8/1989 | Yamanaka | ........ H01L 21/67144 |
| | | | | 356/392 |
| 5,796,161 A | * | 8/1998 | Moon | ...................... H01L 24/78 |
| | | | | 228/49.1 |

(Continued)

FOREIGN PATENT DOCUMENTS

| JP | 08-097241 | 4/1996 |
| JP | 2002-064121 | 2/2002 |

(Continued)

OTHER PUBLICATIONS

International Search Report dated May 2, 2022 for International Patent Application No. PCT/US2022/012406.

*Primary Examiner* — Kathleen Y Dulaney
(74) *Attorney, Agent, or Firm* — Christopher M. Spletzer, Sr.

(57) ABSTRACT

A method of operating a pattern recognition system of an electronic device packaging machine is provided. The method includes the steps of: (a) imaging a portion of a workpiece on an electronic device packaging machine using an image acquisition recipe; (b) utilizing a pattern recognition recipe in connection with an image from step (a) to determine if an acceptable level of matching occurs; and (c) automatically varying at least one parameter of at least one of (i) the image acquisition recipe and (ii) the pattern recognition recipe if the acceptable level of matching does not occur in step (b).

18 Claims, 6 Drawing Sheets

(51) Int. Cl.
*G06V 10/74* (2022.01)
*G06V 20/60* (2022.01)

(52) U.S. Cl.
CPC .... G06V 20/60 (2022.01); *G06T 2207/10152* (2013.01); *G06T 2207/30148* (2013.01)

(58) Field of Classification Search
CPC ........ G06T 2207/30168; G06T 7/0006; G06V 10/141; G06V 10/74; G06V 20/60; G06V 2201/06
USPC ...................... 382/155, 141; 228/102; 700/57
See application file for complete search history.

(56) References Cited

U.S. PATENT DOCUMENTS

| | | | | |
|---|---|---|---|---|
| 6,449,516 | B1* | 9/2002 | Kyomasu | G06T 7/70 700/59 |
| 6,831,673 | B2* | 12/2004 | Wakisaka | B41J 2/451 257/E33.073 |
| 10,324,046 | B1* | 6/2019 | Fu | G03F 7/70616 |
| 2001/0011706 | A1* | 8/2001 | Nara | G03F 7/70616 250/397 |
| 2002/0181758 | A1 | 12/2002 | Song | |
| 2003/0076989 | A1* | 4/2003 | Maayah | G06T 7/0004 382/145 |
| 2004/0028349 | A1* | 2/2004 | Nagasaka | G02B 6/4204 385/88 |
| 2004/0151993 | A1* | 8/2004 | Hasegawa | G03F 1/64 430/5 |
| 2004/0261947 | A1* | 12/2004 | Haraguchi | H01L 24/81 156/379 |
| 2007/0120056 | A1* | 5/2007 | Nagatomo | G06T 7/0006 250/310 |
| 2007/0181807 | A1* | 8/2007 | Fukuda | H01J 37/263 250/310 |
| 2007/0210252 | A1* | 9/2007 | Miyamoto | H01J 37/28 250/310 |
| 2007/0253616 | A1* | 11/2007 | Suto | G06V 10/7515 382/151 |
| 2008/0170239 | A1* | 7/2008 | Uemura | G03F 9/7092 356/620 |
| 2008/0250384 | A1* | 10/2008 | Duffy | G03F 7/70525 716/55 |
| 2009/0051894 | A1* | 2/2009 | Shibazaki | G03F 7/7085 355/72 |
| 2009/0088997 | A1* | 4/2009 | Kikuchi | G05B 19/4188 702/81 |
| 2009/0245637 | A1* | 10/2009 | Barman | G06V 10/25 382/173 |
| 2011/0181688 | A1* | 7/2011 | Miyamoto | G01B 15/04 348/E7.001 |
| 2011/0299760 | A1* | 12/2011 | Harada | G01N 23/2251 382/141 |
| 2012/0004879 | A1* | 1/2012 | Fukuda | H01J 37/263 702/83 |
| 2012/0024089 | A1* | 2/2012 | Couey | H01L 24/85 228/102 |
| 2012/0245861 | A1* | 9/2012 | Greene | H01L 22/12 702/40 |
| 2013/0234019 | A1* | 9/2013 | Miyamoto | G02B 21/0016 250/306 |
| 2013/0326443 | A1* | 12/2013 | Geshel | G03F 7/70475 716/110 |
| 2014/0212022 | A1* | 7/2014 | Geshel | G01R 31/26 382/149 |
| 2014/0219546 | A1* | 8/2014 | Minekawa | G06T 7/0004 382/149 |
| 2015/0006103 | A1* | 1/2015 | De Wel | G03F 7/7065 702/123 |
| 2015/0146967 | A1* | 5/2015 | Miyamoto | H01L 22/12 382/145 |
| 2015/0162299 | A1* | 6/2015 | Keller | H01L 21/67253 228/104 |
| 2016/0076918 | A1* | 3/2016 | Roider | G01D 5/35341 250/227.16 |
| 2016/0350905 | A1* | 12/2016 | Dalla-Torre | G06T 7/001 |
| 2018/0218493 | A1* | 8/2018 | Zhang | G06T 7/0006 |
| 2020/0082203 | A1* | 3/2020 | Gaessler | G06V 10/96 |
| 2020/0088654 | A1* | 3/2020 | Mori | H01L 22/12 |
| 2020/0411345 | A1* | 12/2020 | Kondo | G06T 7/001 |
| 2021/0042900 | A1* | 2/2021 | Kimizuka | G06T 7/001 |

FOREIGN PATENT DOCUMENTS

| | | |
|---|---|---|
| JP | 2006-041006 | 2/2006 |
| KR | 10-2017-0126787 | 11/2017 |

* cited by examiner

INTELLIGENT PATTERN RECOGNITION SYSTEMS FOR WIRE BONDING AND OTHER ELECTRONIC COMPONENT PACKAGING EQUIPMENT, AND RELATED METHODS

CROSS-REFERENCE TO RELATED APPLICATION

This application claims the benefit of U.S. Provisional Application No. 63/138,377, filed Jan. 15, 2021, the content of which is incorporated herein by reference.

FIELD

The invention relates to intelligent pattern recognition systems and methods for electronic component packaging equipment, and more particularly, to improved pattern recognition systems and methods for wire bonding.

BACKGROUND

In the processing and packaging of semiconductor devices or other devices, various pieces of equipment may be utilized. For example, conventional approaches to semiconductor packaging involve a die attach process (e.g., on a die bonding machine, also known as a die attach machine) followed by a wire bonding process (e.g., on a wire bonding machine such as a wedge bonding machine or a ball bonding machine). In other examples, advanced packaging equipment may also be used (e.g., thermocompression bonding machines, flip chip bonding machines, etc.).

In connection with such equipment, pattern recognition systems are commonly used. For example, prior to attaching a die to a substrate in a die attach process, pattern recognition systems may be used to ensure proper placement. Likewise, prior to formation of wire bonds in a wire bonding process, pattern recognition systems may be used to ensure proper wire bond placement. Exemplary pattern recognition systems utilize imaging systems (wherein an exemplary imaging system is a camera, or includes a camera) and image processing software on a computer.

Unfortunately, conventional pattern recognition systems and methods are inefficient and cumbersome. Often, if an acceptable level of matching does not occur in connection with a pattern recognition system, operation of the underlying electronic component packaging system is interrupted so that an operator can make an adjustment.

Thus, it would be desirable to provide improved pattern recognition systems and methods.

SUMMARY

According to an exemplary embodiment of the invention, a method of operating a pattern recognition system of an electronic device packaging machine is provided. The method includes the steps of: (a) imaging a portion of a workpiece on an electronic device packaging machine using an image acquisition recipe; (b) utilizing a pattern recognition recipe in connection with an image from step (a) to determine if an acceptable level of matching occurs; and (c) automatically varying at least one parameter of at least one of (i) the image acquisition recipe and (ii) the pattern recognition recipe if the acceptable level of matching does not occur in step (b).

According to another exemplary embodiment of the invention, a pattern recognition system of an electronic device packaging machine is provided. The pattern recognition system includes: an imaging system for imaging a portion of a workpiece on an electronic device packaging machine using an image acquisition recipe; a control system for controlling the imaging system; and a computer configured to utilize a pattern recognition recipe in connection with an image from the imaging system to determine if an acceptable level of matching occurs. The computer varies at least one parameter of at least one of (i) the image acquisition recipe and (ii) the pattern recognition recipe if the acceptable level of matching does not occur in connection with the pattern recognition recipe by the computer.

According to yet another exemplary embodiment of the invention, a wire bonding system is provided. The wire bonding system includes: a support structure for supporting a workpiece during a wire bonding operation; a bond head assembly carrying a wire bonding tool; and a pattern recognition system. The pattern recognition system includes: an imaging system for imaging a portion of the workpiece using an image acquisition recipe; a control system for controlling the imaging system; and a computer configured to utilize a pattern recognition recipe in connection with an image from the imaging system to determine if an acceptable level of matching occurs. The computer varies at least one parameter of at least one of (a) the image acquisition recipe and (b) the pattern recognition recipe if the acceptable level of matching does not occur in connection with the pattern recognition recipe by the computer.

According to yet another exemplary embodiment of the invention, a method of operating a pattern recognition system of an electronic device packaging machine is provided. The method includes the steps of: (a) imaging a portion of a workpiece on an electronic device packaging machine using an image acquisition recipe; and (b) utilizing a pattern recognition recipe in connection with an image from step (a) to determine if an acceptable level of matching occurs. Each of the image acquisition recipe and the pattern recognition recipe is one of a plurality of recipes stored in memory in connection with the electronic device packaging machine.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

According to certain exemplary embodiments of the invention, smart machine vision pattern recognition systems (e.g., pattern recognition systems of electronic device packaging machines) and methods (e.g., methods of operating pattern recognition systems of electronic device packaging machines) are provided. Such smart machine vision pattern recognition systems and methods are able to change settings (e.g., parameters) within pre-defined ranges. That is, to reduce downtime due to failed machine vision pattern recognition, machine vision settings (e.g., parameters of an image acquisition recipe, parameters of a pattern recognition recipe, etc.) are automatically changed within pre-defined ranges to increase recognition success.

More specifically, in certain exemplary embodiments of the invention, a number of parameters (e.g., light brightness, image pre-processing including filters, camera image acquisition settings, etc.) are automatically adjusted and tried within pre-defined limits once a previous pattern recognition recipe (and/or image acquisition recipe) fails in an attempt to increase pattern recognition success.

In the event that the adjustment of the parameters results in improved pattern recognition success (e.g., an acceptable level of matching, a passing score, etc.), the adjusted permutation of parameters (e.g., a new recipe, or an adjusted/ "new" recipe) may be used as a starting point for the next pattern match operation of the same kind (or as an alternate permutation of the parameters for future use). If the adjusted permutation(s) does not achieve pattern recognition success, an operator may need to manually assist in parameter adjustment (e.g., a manually adjusted recipe), where this manually adjusted recipe may be used as a starting point for the next pattern match operation of the same kind (or as an alternate permutation of the parameters for future use).

In accordance with certain exemplary embodiments of the invention, statistics related to successful and failing parameter sets (e.g., recipes) may be logged for future use (e.g., evaluation and optimization using machine learning algorithms). The pattern recognition system includes (i) imaging hardware (camera, optical elements, lighting, filters, lenses, mirrors, etc.), and (ii) image processing software for doing pattern recognition.

In accordance with aspects of the invention, a recipe (e.g., an image acquisition recipe, a pattern recognition recipe, etc.) includes a plurality of imaging variables/parameters. Such variables/parameters may include (i) a plurality of parameters related to the imaging system (e.g., parameters related to light, exposure, intensity, focus, etc), and (ii) a plurality of image processing parameters (e.g., parameters related to pattern matching, software adjustments such as suppression and pre-processing parameters).

In accordance with aspects of the invention, an acceptable level of matching shall be as understood by those skilled in the art. For example, the acceptable level of matching may be determined by comparing (a) a pattern from an acquired image (e.g., taken by an imaging system) with (b) a reference pattern (e.g., a reference pattern from a previously taught image, a pattern from a reference image, a pattern from a synthetic image, etc.). Other exemplary aspects of detecting if an acceptable level of matching occurs includes utilizing a score (e.g., a passing score, a failing score, etc.), a threshold, etc.

Once an acceptable level of matching occurs (e.g., in connection with one or more fiducial markings on a workpiece), the operation of the given electronic device packaging machine may proceed. For example, on a die attach machine, with an acceptable level of matching, one or more semiconductor die may be attached to the workpiece. In another example, on a wire bonding machine, with an acceptable level of matching, one or more wire loops may be bonded to the workpiece.

As will be appreciated by those skilled in the art, an acceptable level of matching may not occur for a number of reasons. For example, an image provided by an imaging system may not be recognizable using an existing image acquisition recipe and/or an existing pattern recognition recipe. By changing one or more parameters (of one or both recipes) in connection with an iterative process, an acceptable level of matching may occur.

As used herein, the term "image acquisition recipe" relates to a plurality of parameters/settings, related to (and/or used in connection with) an image acquisition process and/or an imaging system, to acquire an image. Examples of the plurality of parameters/settings related to the image acquisition process and/or imaging system include: (i) one or more lighting parameters (e.g., brightness of illumination, exposure time, camera gain, and light color) of the imaging system; (ii) one or more optical parameters of the imaging system; (iii) one or more position parameters of the imaging system; and (iv) one or more component parameters related to the imaging system.

As used herein, the term "pattern recognition recipe" relates to a plurality of parameters/settings used in connection with a pattern recognition process. Examples of the plurality of parameters/settings used in connection with a pattern recognition process include a plurality of image processing parameters. The plurality of image processing parameters includes at least one of image filtering parameters, image resolution parameters, parameters related to pattern matching, and parameters related to determining a level of matching.

Figure 1:
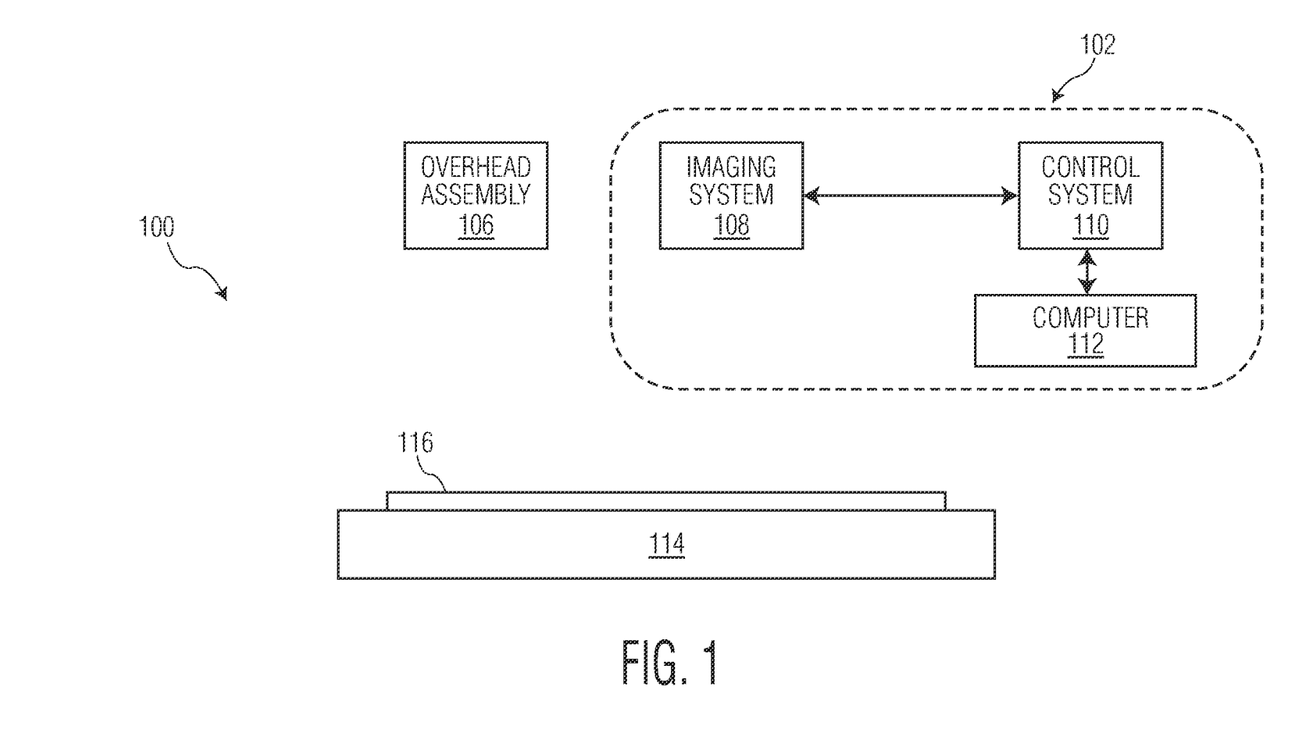
FIG. 1 is a block diagram side view of an electronic component packaging system in accordance with an exemplary embodiment of the invention.

Referring now to the drawings, in FIG. 1, an electronic component packaging machine 100 (e.g., a semiconductor packaging machine, a die attach machine, a wire bonding machine, a thermocompression bonding machine, a flip chip bonding machine, a pick and place machine, a laser welding machine, etc.) is illustrated. Electronic component packaging machine 100 includes: an overhead assembly 106 (e.g., a bond head assembly); a pattern recognition system 102; and a support structure 114 (illustrated supporting a workpiece 116). Pattern recognition system 102 includes: an imaging system 108 for imaging a portion of workpiece 116 using an image acquisition recipe; a control system 110 for controlling imaging system 108; and a computer 112 configured to utilize a pattern recognition recipe in connection with an image from imaging system 108 to determine if an acceptable level of matching occurs.

Figure 2:
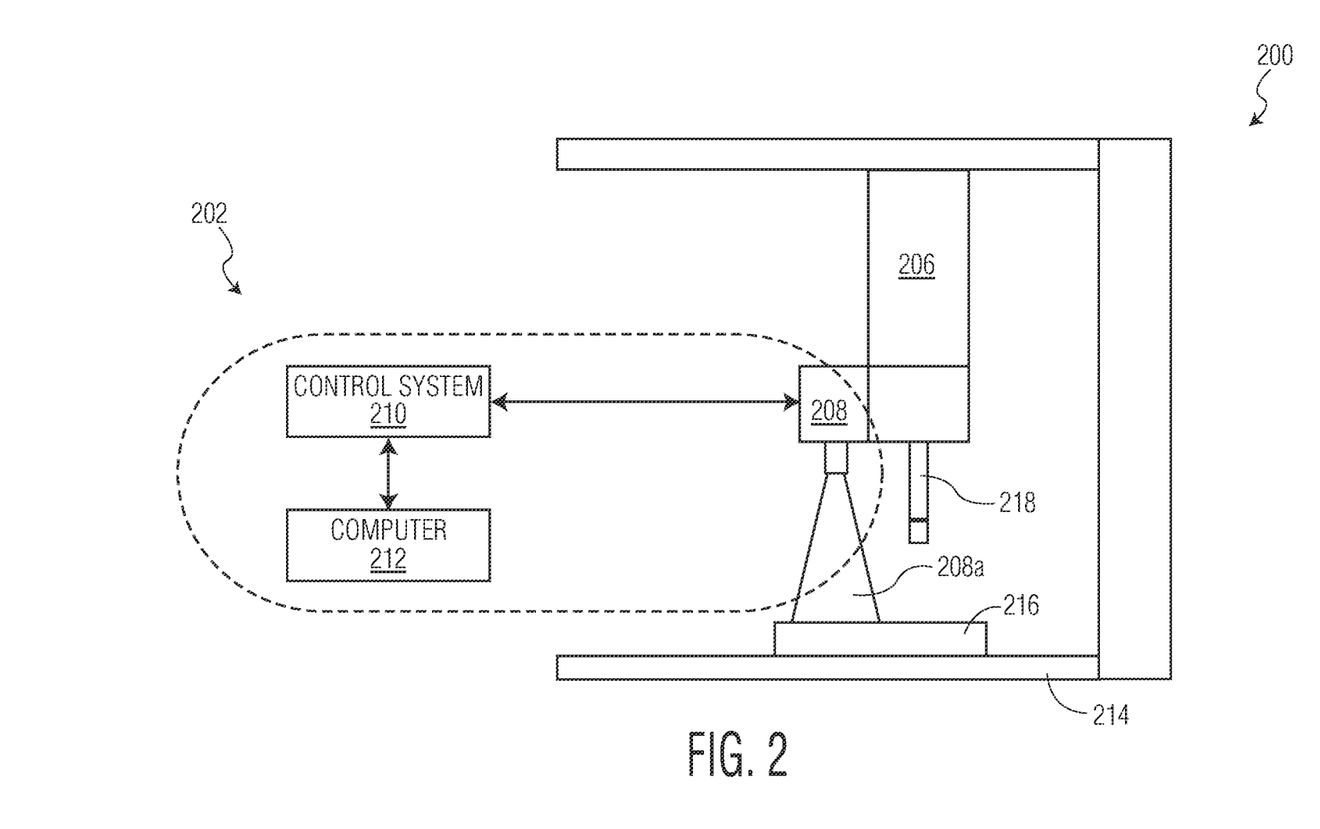
FIG. 2 is a block diagram side view of a wire bonding machine in accordance with an exemplary embodiment of the invention.

In FIG. 2, a wire bonding machine 200 is illustrated. Wire bonding machine 200 includes a bond head assembly 206, a wire bonding tool 218, a support structure 214 (illustrated supporting workpiece 216), and a pattern recognition system 202. Pattern recognition system 202 includes: an imaging system 208 (for imaging a portion of workpiece 216 using an image acquisition recipe); a control system 210 (for controlling imaging system 208); and a computer 212 (configured to utilize a pattern recognition recipe in connection with an image from imaging system 208 to determine if an acceptable level of matching occurs). Imaging system 208 is illustrated transmitting light 208*a* to a portion of workpiece 216, in connection with an imaging step using an image acquisition recipe (e.g., see Step 402, 502, or 602 of FIG. 4, FIG. 5, or FIG. 6). When imaging the portion of workpiece 216, a fiducial image (e.g., fiducial images 322*a*, 322*b*, 322*c* of FIGS. 3A, 3B, and 3C) is detected and used to determine if an acceptable level of matching has occurred before continuing operations of wire bonding machine 200.

Figure 3A:
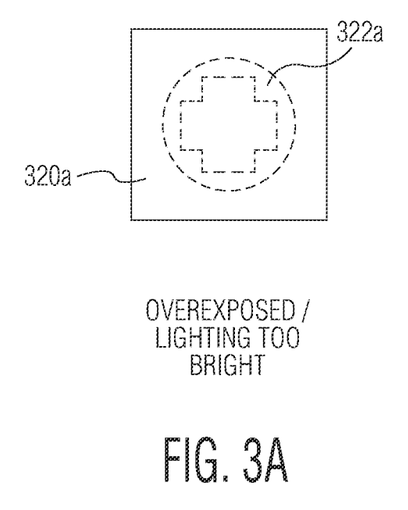
FIGS. 3A-3C are overhead block diagram views of field of view images of fiducial markings of a workpiece useful for explaining various exemplary embodiments of the invention.
Figure 3B:
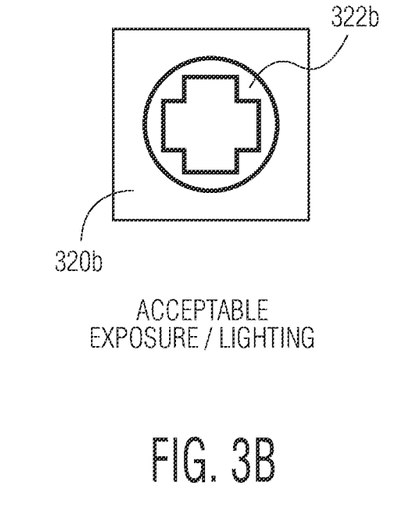
Figure 3C:
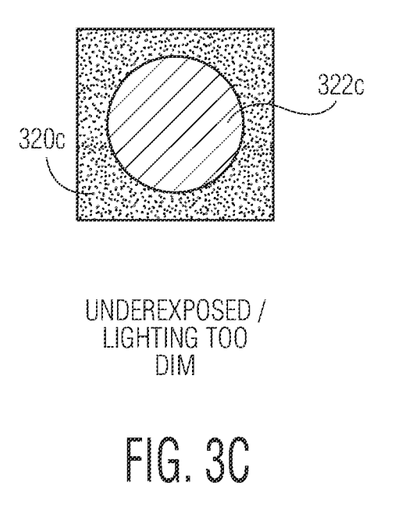

Referring now to FIGS. 3A-3C, fiducial images of various lighting exposure are illustrated. FIG. 3A illustrates fiducial image 322*a* within field of view 320*a* being "overexposed" (i.e., the lighting being too bright). FIG. 3B illustrates fiducial image 322*b* within field of view 320*b* with an acceptable level of exposure/lighting. FIG. 3C illustrates fiducial image 322*c* within field of view 320*c* being "underexposed" (i.e., the lighting being too dim).

Figure 4:
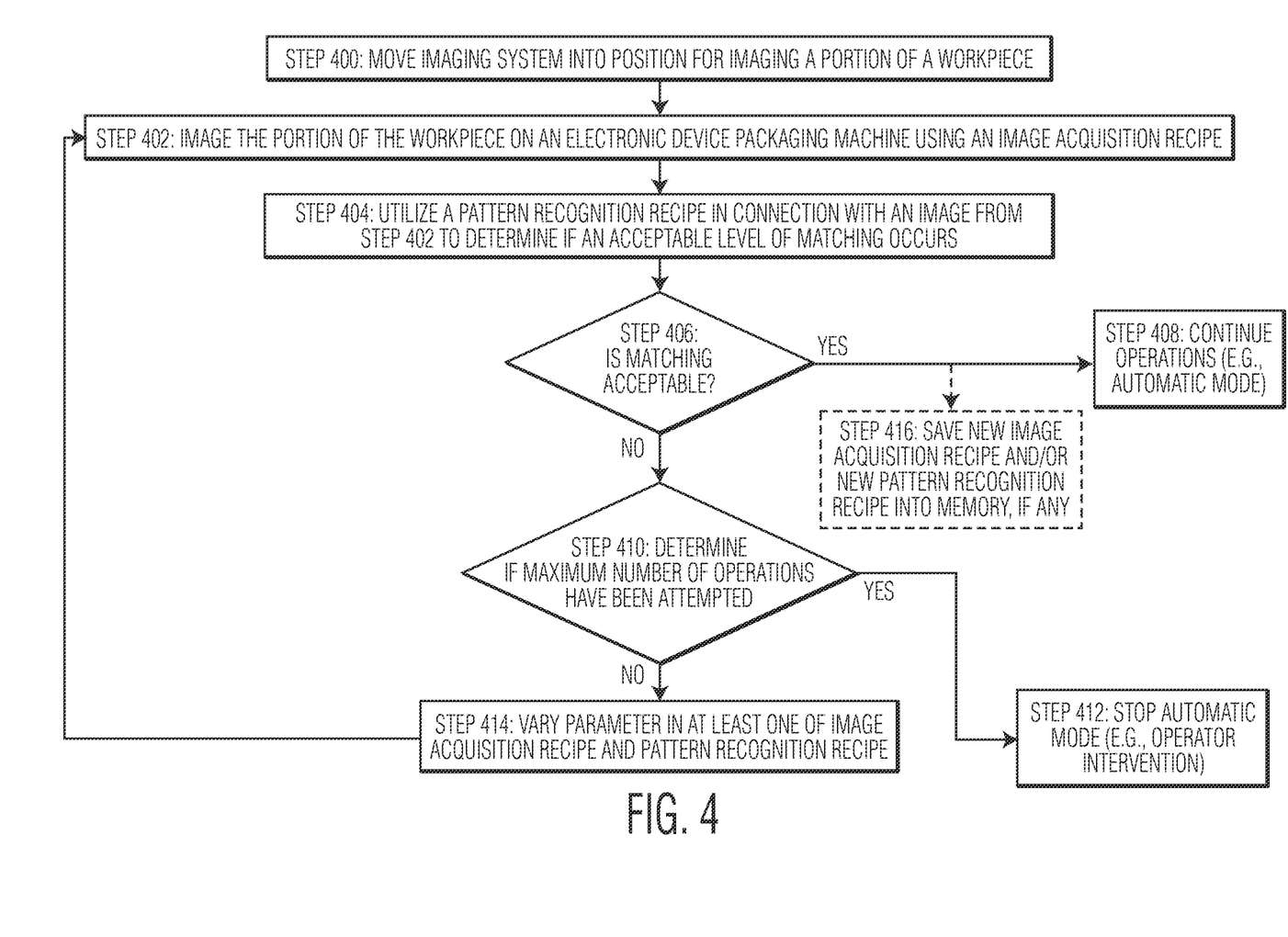
FIGS. 4-6 are flow diagrams illustrating various methods of operating a pattern recognition system of an electronic device packaging machine in accordance with various exemplary embodiments.
Figure 5:
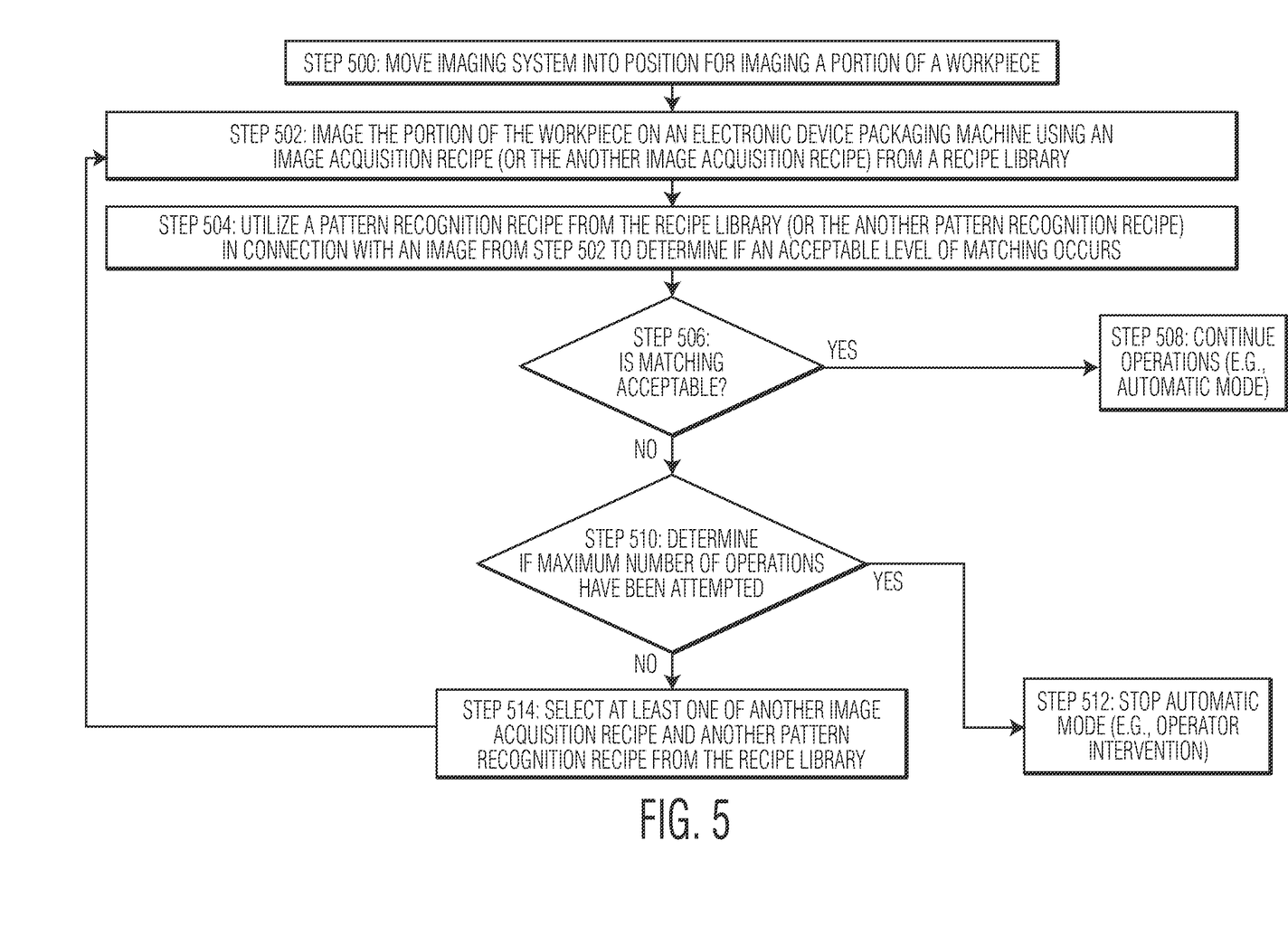
Figure 6:
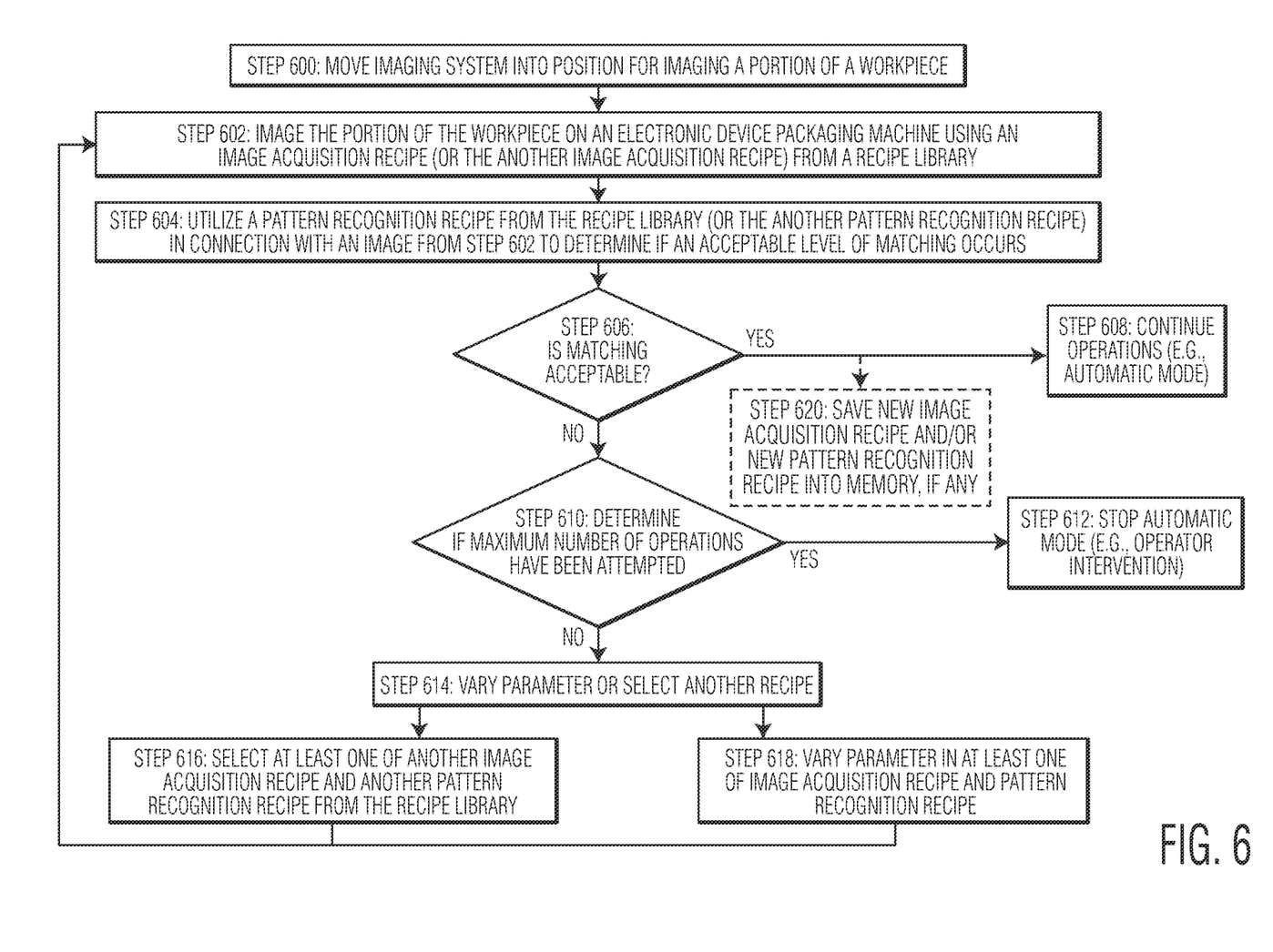

FIGS. 4-6 are flow diagrams illustrating various methods of operating a pattern recognition system of an electronic device packaging machine. As is understood by those skilled in the art, certain steps included in the flow diagrams may be omitted; certain additional steps may be added; and the order of the steps may be altered from the order illustrated—all within the scope of the invention.

Referring now to FIG. 4, at Step 400, an imaging system (e.g., see imaging system 108 from FIG. 1, imaging system 208 from FIG. 2) is moved into position for imaging a portion of a workpiece (e.g., see workpiece 116 from FIG. 1, workpiece 216 from FIG. 2). At Step 402, the portion of the workpiece (e.g., a fiducial marking on the workpiece) on an electronic device packaging machine is imaged using an image acquisition recipe. At Step 404, a pattern recognition recipe is utilized in connection with an image from Step 402 to determine if an acceptable level of matching occurs. At Step 406, a determination is made as to whether the level of matching is acceptable. If the level of matching is acceptable, operations are continued (e.g., automatic mode) in Step 408. If the level of matching is unacceptable, a determination is made as to whether the maximum number of operations have been attempted at Step 410. If the maximum number of operations have been attempted, automatic mode is stopped (e.g., operator intervention) at Step 412. If the maximum number of operations have not been attempted, a parameter in at least one of image acquisition recipe and pattern recognition recipe is varied at Step 414 (e.g., the parameter is varied within a range provided in the given recipe). Steps 402 and 404 are then repeated using the varied parameter. At repeated Step 406, a determination is made as to whether the level of matching is acceptable. If the level of matching is acceptable, a new image acquisition recipe and/or new pattern recognition recipe is saved into memory at Step 416 (and may be used as the new starting recipe on the machine); operations are then continued (e.g., automatic mode) in Step 408. If matching is unacceptable, a determination is made as to whether the maximum number of operations have been attempted at Step 410. Steps 414, 402, 404, 406, and 410 are then repeated until Step 406 or 410 is satisfied.

Referring now to FIG. 5, at Step 500, an imaging system (e.g., see imaging system 108 from FIG. 1, imaging system 208 from FIG. 2) is moved into position for imaging a portion of a workpiece (e.g., see workpiece 116 from FIG. 1, workpiece 216 from FIG. 2). At Step 502, the portion of the workpiece (e.g., a fiducial marking on the workpiece) on an electronic device packaging machine is imaged using an image acquisition recipe (or another image acquisition recipe) from a recipe library. For example, the recipe library may include a plurality of image acquisition recipes and/or a plurality of pattern recognition recipes. The initial image acquisition recipe used in Step 502 (and the initial pattern recognition recipe used in Step 504) may be selected based on some prioritization criteria. For example, recipes that are more likely (e.g., based on past experience) to result in an acceptable level of matching in Step 504 may be prioritized over other recipes in the recipe library.

At Step 504, a pattern recognition recipe from the recipe library (or another pattern recognition recipe) is utilized in connection with an image from Step 502 to determine if an acceptable level of matching occurs. At Step 506, a determination is made as to whether the level of matching is acceptable. If the level of matching is acceptable, operations are continued (e.g., automatic mode) in Step 508. If the level of matching is unacceptable, a determination is made as to whether the maximum number of operations have been attempted at Step 510. If the maximum number of operations have been attempted, automatic mode is stopped (e.g., operator intervention) at Step 512. If the maximum number of operations have not been attempted, at least one of another image acquisition recipe and another pattern recognition recipe from the recipe library is selected at Step 514. The another recipe (e.g., the another image acquisition recipe and/or the another pattern recognition recipe) may be selected at Step 514 based on some prioritization criteria. For example, recipes that are more likely (e.g., based on past experience) to result in an acceptable level of matching may be prioritized over other recipes in the recipe library.

After the another recipe(s) is selected at Step 514, Steps 502 and 504 are then repeated using at least one of another image acquisition recipe and another pattern recognition recipe from the recipe library. At repeated Step 506, a determination is made as to whether the level of matching is acceptable. If the level of matching is acceptable, operations are then continued (e.g., automatic mode) in Step 508. If the level of matching is unacceptable, a determination is made as to whether the maximum number of operations have been attempted at Step 510. Steps 514, 502, 504, 506 and 510 are then repeated until Step 506 or 510 is satisfied.

Referring now to FIG. 6, at Step 600, an imaging system (e.g., see imaging system 108 from FIG. 1, imaging system 208 from FIG. 2) is moved into position for imaging a portion of a workpiece (e.g., see workpiece 116 from FIG. 1, workpiece 216 from FIG. 2). At Step 602, the portion of the workpiece (e.g., a fiducial marking on the workpiece) on an electronic device packaging machine is imaged using an image acquisition recipe (or another image acquisition recipe) from a recipe library. At Step 604, a pattern recognition recipe from the recipe library (or another pattern recognition recipe) is utilized in connection with an image from Step 602 to determine if an acceptable level of matching occurs. At Step 606, a determination is made as to whether the level of matching is acceptable. If the level of matching is acceptable, operations are continued (e.g., automatic mode) in Step 608. If the level of matching is unacceptable, a determination is made as to whether the maximum number of operations have been attempted at Step 610. If the maximum number of operations have been attempted, automatic mode is stopped (e.g., operator intervention) at Step 612. If the maximum number of operations have not been attempted, a determination is made as to whether a parameter shall be varied and/or another recipe shall be selected at Step 614. This determination may be made using software (e.g., an intelligent algorithm). For example, after a certain number of recipes from a recipe library are tried, one or more parameters of a recipe may be varied. In another example, after one or more parameters of an existing recipe are varied, a different recipe from the recipe library may be selected.

Further, in connection with the determination as to whether a parameter shall be varied and/or another recipe shall be selected—additional considerations may be made.

Historical data (e.g., in the form of histograms or the like) may be used to prioritize different recipes based on their historical pass rate (e.g., an acceptable level of matching) on a particular piece of equipment (e.g., a particular wire bonder). For example, a recipe with highest passing rate may be prioritized first. A user may be provided with an option as to whether: (i) to vary a parameter of the current recipe; (ii) to select another recipe; (iii) to try all of the recipes in the library first, before varying one of the recipes; etc. In another example, the decision as to whether to vary an existing recipe (by varying one or more parameters) or to try a new recipe from the library, can also be made by calculating an amount (e.g., a score) by which the level of matching failed. If the amount/score is within a pre-defined tolerance, a slight change to a parameter (e.g., an image acquisition parameter or a pattern recognition parameter) may be utilized, as opposed to using a new recipe from the library if the amount/score is not within a pre-defined tolerance.

If another recipe is to be selected, at Step 616, at least one of another image acquisition recipe and another pattern recognition recipe is selected from the recipe library. If it is determined that a parameter should be varied, at Step 618, a parameter in at least one of image acquisition recipe and pattern recognition recipe is varied (e.g., the parameter is varied within a range provided in the given recipe). Steps 602 and 604 are then repeated using the varied parameter and/or the another recipe. At repeated Step 606, a determination is made as to whether the level of matching is acceptable. If the level of matching is acceptable, a new image acquisition recipe and/or new pattern recognition recipe is saved into memory (if applicable) (and may be used as the new starting recipe on the machine) at Step 620. If the level of matching is unacceptable, a determination is made as to whether the maximum number of operations have been attempted at Step 610. Steps 614, 602, 604, 606 and 610 are then repeated until Step 606 or 610 is satisfied.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of operating a pattern recognition system of a wire bonding machine, the method comprising the steps of:
   (a) imaging a portion of a workpiece on the wire bonding machine using an image acquisition recipe, the portion of the workpiece including a fiducial marking of the workpiece, the image acquisition recipe including a plurality of parameters related to an imaging system of the pattern recognition system, the plurality of parameters including at least one of (i) one or more lighting parameters of the imaging system, (ii) one or more optical parameters of the imaging system, (iii) one or more position parameters of the imaging system, and (iv) one or more component parameters related to the imaging system;
   (b) utilizing a pattern recognition recipe in connection with an image from step (a) to determine if an acceptable level of matching occurs in connection with the fiducial marking of the workpiece to determine if a wire bonding operation may proceed, wherein the acceptable level of matching is determined by comparing a pattern from an acquired image taken by the imaging system with a reference pattern;
   (c) automatically varying at least one parameter of the image acquisition recipe if the acceptable level of matching does not occur in step (b);
   (d) repeating steps (a)-(c), using a new image acquisition recipe including the at least one parameter that was automatically varied, until an acceptable level of matching occurs in step (b); and
   (e) saving the new image acquisition recipe into memory if step (b) results in an acceptable level of matching.

2. The method of claim 1 wherein the pattern recognition system includes a control system for controlling the imaging system, and a computer.

3. The method of claim 1 wherein the one or more lighting parameters includes at least one of brightness of illumination, exposure time, camera gain, and light color.

4. The method of claim 2 wherein the pattern recognition recipe includes a plurality of image processing parameters used in connection with step (b).

5. The method of claim 4 wherein the plurality of image processing parameters includes at least one of image filtering parameters, image resolution parameters, parameters related to pattern matching, and parameters related to determining a level of matching in connection with step (b).

6. The method of claim 1 wherein the varying of the at least one parameter in step (c) results in the new image acquisition recipe.

7. The method of claim 1 wherein the pattern recognition recipe and the image acquisition recipe are included in a library, the library including a plurality of recipes stored in memory in connection with the wire bonding machine.

8. The method of claim 7 wherein, if an acceptable level of matching does not occur based on step (b), another one of the plurality of recipes stored in memory is selected, and steps (a) and (b) are repeated using the another of the plurality of recipes prior to step (c).

9. A pattern recognition system of a wire bonding machine, the pattern recognition system comprising:
   an imaging system for imaging a portion of a workpiece on the wire bonding machine using an image acquisition recipe, the portion of the workpiece including a fiducial marking of the workpiece, the image acquisition recipe including a plurality of parameters related to the imaging system of the pattern recognition system, the plurality of parameters including at least one of (i) one or more lighting parameters of the imaging system, (ii) one or more optical parameters of the imaging system, (iii) one or more position parameters of the imaging system, and (iv) one or more component parameters related to the imaging system;
   a control system for controlling the imaging system; and
   a computer configured to utilize a pattern recognition recipe in connection with an image from the imaging system to determine if an acceptable level of matching occurs in connection with the fiducial marking of the workpiece to determine if a wire bonding operation may proceed, wherein the acceptable level of matching is determined by comparing a pattern from an acquired image taken by the imaging system with a reference pattern, the computer varying at least one parameter of the image acquisition recipe if the acceptable level of matching does not occur, the varying of the at least one parameter by the computer resulting in a new image acquisition recipe, the computer further configured to repeat imaging of the portion of the workpiece using the new image acquisition recipes until an acceptable level of matching occurs, the computer further configured to save the new image acquisition recipe that results in the acceptable level of matching into memory.

10. The pattern recognition system of claim 9 wherein the one or more lighting parameters includes at least one of brightness of illumination, exposure time, camera gain, and light color.

11. The pattern recognition system of claim 9 wherein the pattern recognition recipe includes a plurality of image processing parameters.

12. The pattern recognition system of claim 9 wherein the imaging of the portion of the workpiece and the utilizing of the pattern recognition recipe by the computer are repeated until the computer determines that an acceptable level of matching occurs.

13. The pattern recognition system of claim 9 wherein at least one of the image acquisition recipe and the pattern recognition recipe is one of a plurality of recipes stored in memory in connection with the pattern recognition system.

14. The pattern recognition system of claim 13 wherein, if an acceptable level of matching does not occur, another one of the plurality of recipes stored in memory is selected, and the imaging of the portion of the workpiece and the utilizing of the pattern recognition recipe by the computer are repeated using the another of the plurality of recipes.

15. A wire bonding system comprising:
a support structure for supporting a workpiece during a wire bonding operation;
a bond head assembly carrying a wire bonding tool; and
a pattern recognition system including
(i) an imaging system for imaging a portion of the workpiece using an image acquisition recipe, the portion of the workpiece including a fiducial marking of the workpiece, the image acquisition recipe including a plurality of parameters related to the imaging system of the pattern recognition system, the plurality of parameters including at least one of (a) one or more lighting parameters of the imaging system, (b) one or more optical parameters of the imaging system, (c) one or more position parameters of the imagining system, and (d) one or more component parameters related to the imaging system,
(ii) a control system for controlling the imaging system, and
(iii) a computer configured to utilize a pattern recognition recipe in connection with an image from the imaging system to determine if an acceptable level of matching occurs in connection with the fiducial marking on the workpiece to determine if the wire bonding operation may proceed, wherein the acceptable level of matching is determined by comparing a pattern from an acquired image taken by the imaging system with a reference pattern, the computer varying at least one parameter of the image acquisition recipe if the acceptable level of matching does not occur, the varying of the at least one parameter by the computer resulting in a new image acquisition recipe, the computer further configured to repeat imaging of the portion of the workpiece using the new image acquisition recipes until an acceptable level of matching occurs, the computer further configured to save the new image acquisition recipe that results in the acceptable level of matching into memory.

16. A method of operating a pattern recognition system of a wire bonding machine, the method comprising the steps of:
(a) imaging a portion of a workpiece on the wire bonding machine using an image acquisition recipe, the portion of the workpiece including a fiducial marking of the workpiece, the image acquisition recipe including a plurality of parameters related to an imaging system of the pattern recognition system, the plurality of parameters including at least one of (i) one or more lighting parameters of the imaging system, (ii) one or more optical parameters of the imaging system, (iii) one or more position parameters of the imaging system, and (iv) one or more component parameters related to the imaging system; and
(b) utilizing a pattern recognition recipe in connection with an image from step (a) to determine if an acceptable level of matching occurs in connection with the fiducial marking on the workpiece to determine if a wire bonding operation may proceed, wherein the acceptable level of matching is determined by comparing a pattern from an acquired image taken by the imaging system with a reference pattern,
wherein each of the image acquisition recipe and the pattern recognition recipe is one of a plurality of recipes stored in memory in connection with the wire bonding machine, and the image acquisition recipe is automatically selected to be used in step (a) in an order based on prioritization criteria.

17. The method of claim 16 further comprising the step of automatically varying at least one parameter of the image acquisition recipe if the acceptable level of matching does not occur in step (b).

18. The method of claim 16 wherein if the acceptable level of matching does not occur in step (b), a selection is made to (i) repeat steps (a)-(b) with another of the plurality of recipes, or (ii) automatically vary at least one parameter of the image acquisition recipe.

* * * * *